United States Patent [19]
Kawasaki

[11] Patent Number: 6,049,288
[45] Date of Patent: Apr. 11, 2000

[54] CAR DISPLAY LAYOUT STRUCTURE

[75] Inventor: Yoshiki Kawasaki, Kanagawa-ken, Japan

[73] Assignee: Nissan Motor Co., Ltd., Kanagawa-ken, Japan

[21] Appl. No.: 09/019,557

[22] Filed: Feb. 6, 1998

[30] Foreign Application Priority Data

Feb. 6, 1997 [JP] Japan .................................. 9-023968
Feb. 6, 1997 [JP] Japan .................................. 9-023982

[51] Int. Cl.⁷ .............................. G08B 5/00; B60Q 1/00
[52] U.S. Cl. ...................... 340/815.4; 340/461; 340/995; 248/27.1; 345/7; 348/837; 455/347; 455/348
[58] Field of Search .............................. 340/995, 815.49, 340/815.4, 815.83, 815.86, 461; 248/27.1; 455/347, 348; 348/837; 345/7

[56] References Cited

U.S. PATENT DOCUMENTS

| | | | |
|---|---|---|---|
| 2,946,982 | 7/1960 | Conversano | 340/815.4 |
| 4,886,328 | 12/1989 | Iino | 340/980 |
| 4,995,680 | 2/1991 | Miruri | 312/7.1 |
| 5,161,028 | 11/1992 | Kawata et al. | 348/837 |
| 5,677,701 | 10/1997 | Okuyama et al. | 345/7 |
| 5,822,023 | 10/1998 | Suman et al. | 348/837 |
| 5,825,338 | 10/1998 | Salmon et al. | 345/7 |
| 5,847,685 | 12/1998 | Otsuki | 340/995 |

FOREIGN PATENT DOCUMENTS

| | | |
|---|---|---|
| 0 338 405 A2 | 10/1989 | European Pat. Off. . |
| 0 433 524 A1 | 6/1991 | European Pat. Off. . |
| 0 551 078 A1 | 7/1993 | European Pat. Off. . |
| 0 679 549 A1 | 11/1995 | European Pat. Off. . |
| 6-144081 | 5/1994 | Japan . |
| 6-183284 | 7/1994 | Japan . |
| WO 97/46422 | 12/1997 | WIPO . |

*Primary Examiner*—Daniel J. Wu
*Attorney, Agent, or Firm*—McDermott, Will & Emery

[57] ABSTRACT

A display can be retractably provided on an upper surface of an instrument panel. The display can be arranged such that it is not overlapped with an operation lever in a parking position P and a driving position D, to which the operation lever is frequently shifted during driving, in the course of eyeshot of the driver in a driver's seat. Hence, the operation lever never obstructs the driver's eyeshot looking at a screen of the display. As a result, the driver can easily monitor or watch the screen of the display without obstruction.

19 Claims, 9 Drawing Sheets

CAR DISPLAY LAYOUT STRUCTURE

The contents of Application No. TOKUGANHEI 9-23968, filed on Feb. 6, 1997 and No. TOKUGANHEI 9-23982, filed on Feb. 6, 1997 in Japan are hereby incorporated by reference.

BACKGROUND OF THE INVENTION

The present invention relates to a car display layout structure installed into a vehicle such as a car to be used as a navigation system, etc.

As such a car display device that a navigation display device, a TV set, or the like is arranged in the inside of an instrument panel and then an image displayed on a screen of the navigation display device, the TV set, or the like is projected onto a reflector to be monitored or watched by the driver (or the passenger), a so-called head-up display device has been well known (see Patent Application Publication (KOKAI) Hei 6-183284 or Patent Application Publication (KOKAI) Hei 6-144081). The above reflector is supported on an upper surface of a front window panel or the instrument panel of the vehicle.

If the above head-up display device is arranged just in front of the driver's seat, sometimes such reflector has disturbed the driver's front eyeshot during when the driver drives the car. Hence, in the prior art, often the display has been arranged on the side front portion of the driver's seat.

SUMMARY OF THE INVENTION

However, the car display layout structure in the prior art has following problems. That is to say, in a column shift type automatic transmission in which an operation lever is fitted to a steering shaft, even though the display has been arranged on the side front portion of the driver's seat, it has been difficult for the driver to monitor or watch a screen of the display because the operation lever has overlapped with the screen of the display in the course of the driver's eyeshot looking at the screen.

A temperature of the instrument panel has been increased by radiation heat of the solar light which enters from the front window panel (there have been some cases where the temperature exceeds about 100° C . in the summer season). Unfortunately, the liquid crystal panel which has been widely used as a vehicle-equipped display has a low heat resistance temperature. For this reason, various limitations are imposed on layout of such liquid crystal panel on an upper surface of the instrument panel. As a result, there has been a possibility that the margin in design is narrowed.

Meanwhile, if the display is just simply arranged on the instrument panel, such display has disturbed the driver's front eyeshot.

Therefore, the present invention has been made in light of the above problems in the prior art, and it is an object of the present invention to provide a car display layout structure which enables the driver (or the passenger) to monitor or watch the screen of the display without disturb even if the column shift type operation lever of the automatic transmission is provided, and can prevent surely thermal destruction or damage of the display even if the temperature of the instrument panel is increased up to the high temperature, and can never obstruct the driver's front eyeshot.

In order to achieve the above object of the present invention, according to an aspect of the present invention, there is provided a car display layout structure comprising:

a display arranged in a substantially central area of an upper surface of an instrument panel in a width direction of a vehicle; and an operation lever arranged on a steering wheel side relative to the display, and shifted in a substantially vertical direction between the display and the steering wheel; wherein the display is arranged such that the operation lever shifted to at least one of a driving position and a parking position is positioned at a refuge position displaced from a line connecting an driver's eyepoint with the display.

Accordingly, the range of the operation lever in the column shift type automatic transmission is set in the driving position in most cases during driving, and similarly the range of the operation lever is set in the parking position in most cases during parking. The display can be arranged so as to avoid such frequently used shifting positions. Hence, the operation lever in no way obstructs monitoring or watching the screen of the display, so that monitoring or watching of the screen can be made easy.

In order to achieve the above object of the present invention, according to another aspect of the present invention, there is provided a car display layout structure comprising:

a case fitted onto an upper surface of an instrument panel, the case including an opening portion on an upper surface thereof;

a display capable of being set to an accommodated state and a standing state, the display in the accommodated state being laid in the case, the display in the standing state being set upright out of the case through the opening portion; and a hood being laid and closing the opening portion of the case when the display is in the accommodated state, the hood being stood up and opening the opening portion according to a standing operation of the display, the hood being positioned below a tangent line passing through a driver's eyepoint to a car hood during the standing operation of the display, and the hood including a portion extending from a top end of the display during the standing operation of the display.

Accordingly, since the display can be put away in the case not to expose therefrom, it never obstructs the driver's front eyeshot so that it does not serve as obstruction of the front view of the driver.

In addition, since the hood can be positioned lower than the line connecting the driver's eyepoint with the front hood, both the hood and the display covered with the hood are never set upper than the tangent line. Therefore, there is no case where the display obstructs the driver's front view in driving the car.

In the preferred embodiment of the present invention, the display includes a display panel faced to a bottom of the case when the display is in the accommodated state.

In the preferred embodiment of the present invention, the case includes a ventilating hole penetrating through the bottom thereof, the display panel of the display comes into contact with an air passing through the ventilating hole when the display is in the accommodated state.

Accordingly, since the display panel of the display can contact with the air in the compartment via the ventilating hole in the case, a temperature of the display panel is not increased up to a high temperature by heat of the instrument panel. Therefore, the display panel is not thermally destroyed or damaged even if the liquid crystal panel having small heat resistance is employed.

In the preferred embodiment of the present invention, the instrument panel includes a through hole capable of introducing a air in a compartment into the ventilating hole.

Accordingly, since the through hole of the instrument panel can introduce the air in the compartment into the ventilating hole, the display can be brought surely into contact with the air in the compartment.

In the preferred embodiment of the present invention, the hood is made of two members consisting of a first hood and a second hood in order to reduce a height of the hood projected from the opening portion when the display is in the standing state, and the first hood and the second hood are connected foldably into two pieces such that back surfaces of the first hood and the second hood are opposed to each other when the display is in the standing state.

Accordingly, the hood can be folded into two pieces, it can be firmly prevented from being positioned over the tangent line of the driver's eyeshot to the front hood.

In the preferred embodiment of the present invention, the first hood and the second hood are folded into two pieces along a back and forth direction when the display is in the standing state and, the second hood positioned on a rear side of the hood is folded downward, extends from a top end of the display, and intercepts a light incident into the display panel when the display is in the standing state.

Accordingly, since the second hood can extend from the top end of the display in its standing state like a visor, the display never reflects the solar light to thus provide clear images even if the solar light enters into the compartment through the front window panel.

In the preferred embodiment of the present invention, a front end of the display in the accommodated state is supported by a pin member rotatably and slidably in a back and forth direction, and the display is supported by a rotating plate whose one end is supported rotatably to the case.

In the preferred embodiment of the present invention, the pin member slides back and forth along a guiding member provided in the case, the guiding member is formed to be inclined front-downward such that its front end is positioned lower and its rear end is positioned higher, and a lower end of the display is gradually shifted up toward the opening portion of the case during the standing operation.

In the preferred embodiment of the present invention, one end of the rotating plate is supported rotatably to an axis on a front side of the case and other end of the rotating plate is supported rotatably to an upper surface of the display in the accommodated state, and the lower end of the display is gradually shifted toward a rear end of the opening portion during the standing operation.

In the preferred embodiment of the present invention, the first hood is biased by a first biasing member so as to close the opening portion, the second hood is biased by a second biasing member so as to close the opening portion, and biasing force from the second biasing member is set smaller than biasing force from the first biasing member.

In the preferred embodiment of the present invention, a rotating member is attached to rear top end portion of the display in the accommodated state so as to project from a top surface of the display, and the rotating member comes into contact with a back surface of the hood and pushes up the hood to open the opening portion during the standing operation of the display.

In the preferred embodiment of the present invention, a rib in opposition to the rotating member is arranged on the back surface of the hood, and the rotating member of the display slides on the rib.

In the preferred embodiment of the present invention, an rear end of the hood is positioned below a tangent line passing through driver's eyepoint to the car body hood when the display is in the standing state.

In the preferred embodiment of the present invention, a steering wheel is arranged on a driver side relative to the display, an operation lever shifted in a substantially vertical direction is arranged between the display and the steering wheel, and a display panel of the display in the standing state is arranged such that the operation lever which is shifted to at least one of a driving position and a parking position is positioned at a refuge position displaced from a line connecting driver's eyepoint with the display.

In order to achieve the above object of the present invention, according to still another aspect of the present invention, there is provided a car display layout structure comprising:

a case fitted onto an upper surface of an instrument panel, the case including an opening portion on an upper surface thereof;

a display capable of being set to an accommodated state and a standing state, the display in the accommodated state being laid in the case, the display in the standing state being set upright out of the case through the opening portion; and a hood being laid and closing the opening portion of the case when the display is in the accommodated state, the hood being stood up and opening the opening portion according to a standing operation of the display, the hood being positioned below a tangent line passing through a driver's eyepoint to a car hood during the standing operation of the display, and the hood including a portion extending from a top end of the display during the standing operation of the display; wherein the hood is made of two members consisting of a first hood and a second hood in order to reduce a height of the hood projected from the opening portion when the display is in the standing state, and the first hood and the second hood are connected foldably into two pieces such that back surfaces of the first hood and the second hood are opposed to each other when the display is in the standing state.

In the preferred embodiment of the present invention, the first hood and the second hood are folded into two pieces along a back and forth direction when the display is in the standing state and, the second hood positioned on a rear side of the hood is folded downward, extends from a top end of the display, and intercepts a light incident into the display panel when the display is in the standing state.

In the preferred embodiment of the present invention, a front end of the display in the accommodated state is supported by a pin member rotatable and slidably in a back and forth direction along a guiding member provided in the case, an upper surface portion of the display is supported by a rotating plate whose one end is supported rotatably to the case, the second hood is biased by a biasing member with respect to the first hood so as to close the opening portion, a front end portion of the display in the accommodated state is gradually shifted towards a rear end of the opening portion in a middle of the standing operation of the display, a rear upper end portion of the display in the accommodated state is shifted forward and upward so as to first come into contact with a back surface of the second hood and then come into contact with a back surface of the first hood in the middle of the standing operation of the display, the first and second are pushed up integrally when the rear upper end portion of the display is in contact with the second hood, and the second hood is folded downward by the biasing member when the rear upper end portion of the display is in contact with the first hood.

DESCRIPTION OF THE PREFERRED EMBODIMENTS

Embodiments of the present invention will be explained in detail with reference to accompanying drawings hereinafter.

First Embodiment

Figure 1:
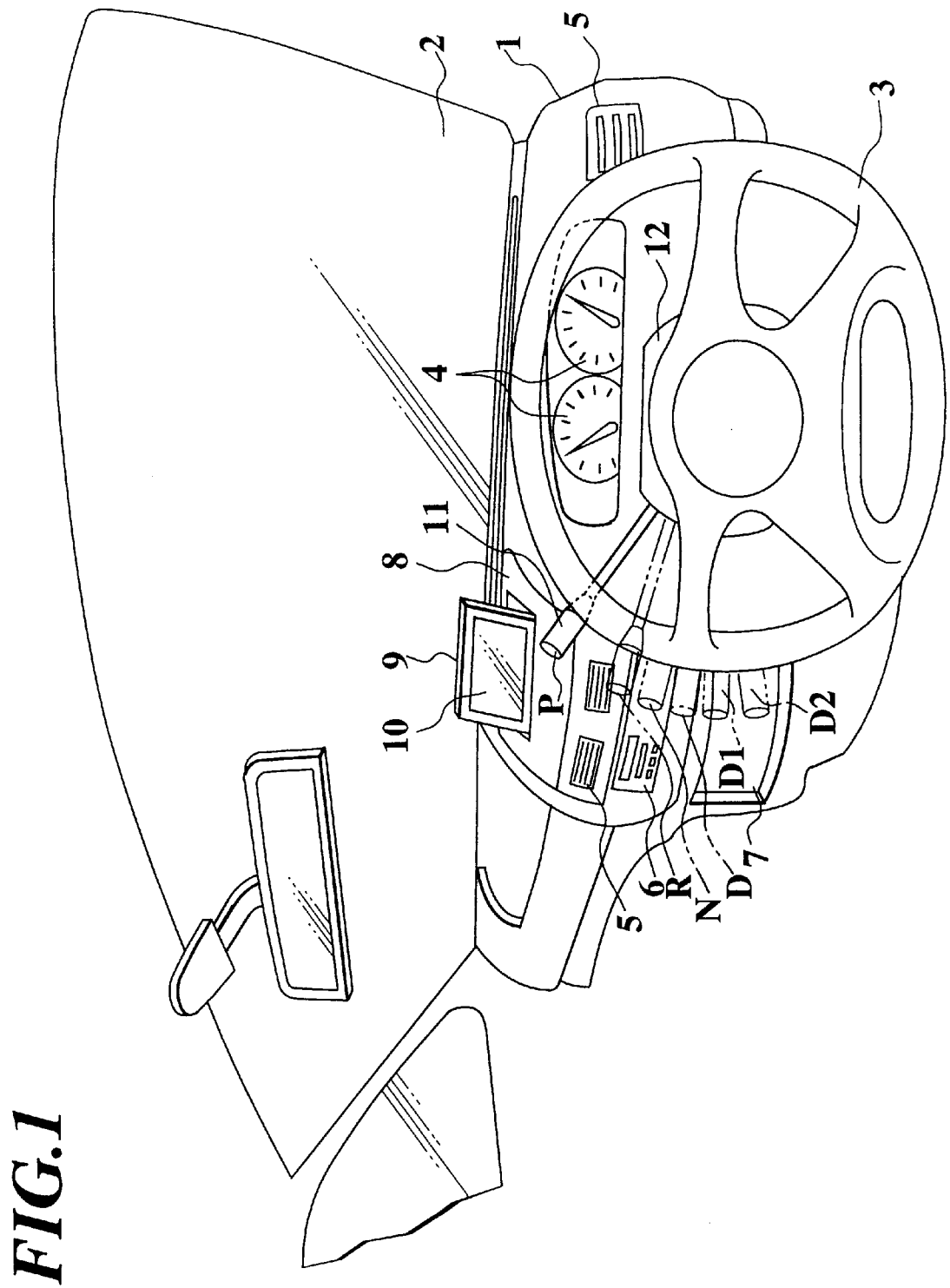
FIG. 1 is a perspective view showing a front layout of a compartment including a retractable setting-up structure for a display according to a first embodiment of the present invention.

FIG. 1 shows a front layout of a compartment including a retractable setting-up structure for a display according to a first embodiment of the present invention.

Meters 4 which are positioned in front of a steering wheel 3 and air outlets 5 which are positioned on both sides of the meters 4 are arranged on an instrument panel 1 respectively.

An audio set 6 is arranged below the air outlets 5 in the central area (left side in FIG. 1) along the width direction of the car body. A fixed display 7 for a multiplex broadcast, etc. is arranged below the audio set 6.

A case 8 which constitutes a part of the instrument panel 1 is fitted onto an upper surface of the instrument panel 1 in the central area (left side in FIG. 1). A display 9 which can be retractably set up by a structure described later is provided in the case 8.

The display 9 has a liquid crystal panel 10 to display images for use in navigation thereon. The display 9 is projected from the case 8 when it is set up.

An operation lever 11 which is used to change ranges of an automatic transmission is provided to extend from a column cover 12 to the center side (left side in FIG. 1). The column cover 12 is provided coaxially with the steering shaft (not shown).

The operation lever 11 can be shifted vertically by the driver. Ranges of the operation lever 11 are set in sequence to a parking position P, a reverse position R, a neutral position N, a normal driving position D, load driving positions D1 and D2 from the top.

The display 9 is arranged on the upper surface of the instrument panel 1. However, it should be noted that a layout of the display 9 is decided in a refuge position such that, when the driver in the driver's seat casts his or her eye at the screen of the display 9, the display 9 is not overlapped with the operation lever 11 which is positioned to the parking position P and the driving position D.

The parking position P is a shift for parking the vehicle. In the event that the driver in the driver's seat looks at the screen of the display 9 to check the destination of the car, etc. during the parking, the operation lever 11 in the parking position P does not obstruct the driver's eyeshot looking at navigation images, for example, on the screen of the liquid crystal panel 10 of the display 9 since the operation lever 11 is not positioned in the course of the eyeshot of the driver to the display 9.

The driving position D is a shift for driving the vehicle. In the event that the driver in the driver's seat looks at the screen of the display 9 to check the current location of the car, etc. during the driving, similarly the operation lever 11 in the driving position D does not obstruct the driver's eyeshot looking at the navigation images, for example, on the screen of the liquid crystal panel 10 of the display 9 since the operation lever 11 is not positioned in the course of the driver's eyeshot to the display 9.

In the meanwhile, the reverse position R is a shift for reversely driving the car and the load driving positions D1, D2 are shifts for driving the car at a low speed. During these positions R, D1, D2, there is no need of displaying navigation images, for example, on the liquid crystal 10 of the display 9. Therefore, even if the operation lever 11 is positioned before the liquid crystal 10 of the display 9, no problem is caused for the driver.

In this manner, when the operation lever 11 is positioned to the parking position P or the driving position D to which the operation lever 11 is frequently positioned during running, the display 9 is designed to be at the refuge position such that the operation lever 11 and the display 9 are not overlapped with each other in the course of the driver's eyeshot to the display 9. Hence, even if the display 9 is arranged on the upper surface of the instrument panel 1, the operation lever 11 never obstructs the driver's eyeshot looking at the display 9, so that the screen of the display 9 can be readily monitored or watched by the driver.

Next, a display fitting structure and a retractable setting-up structure for a display 9 will be explained with reference to FIGS. 2 to 5 hereunder.

Figure 2:
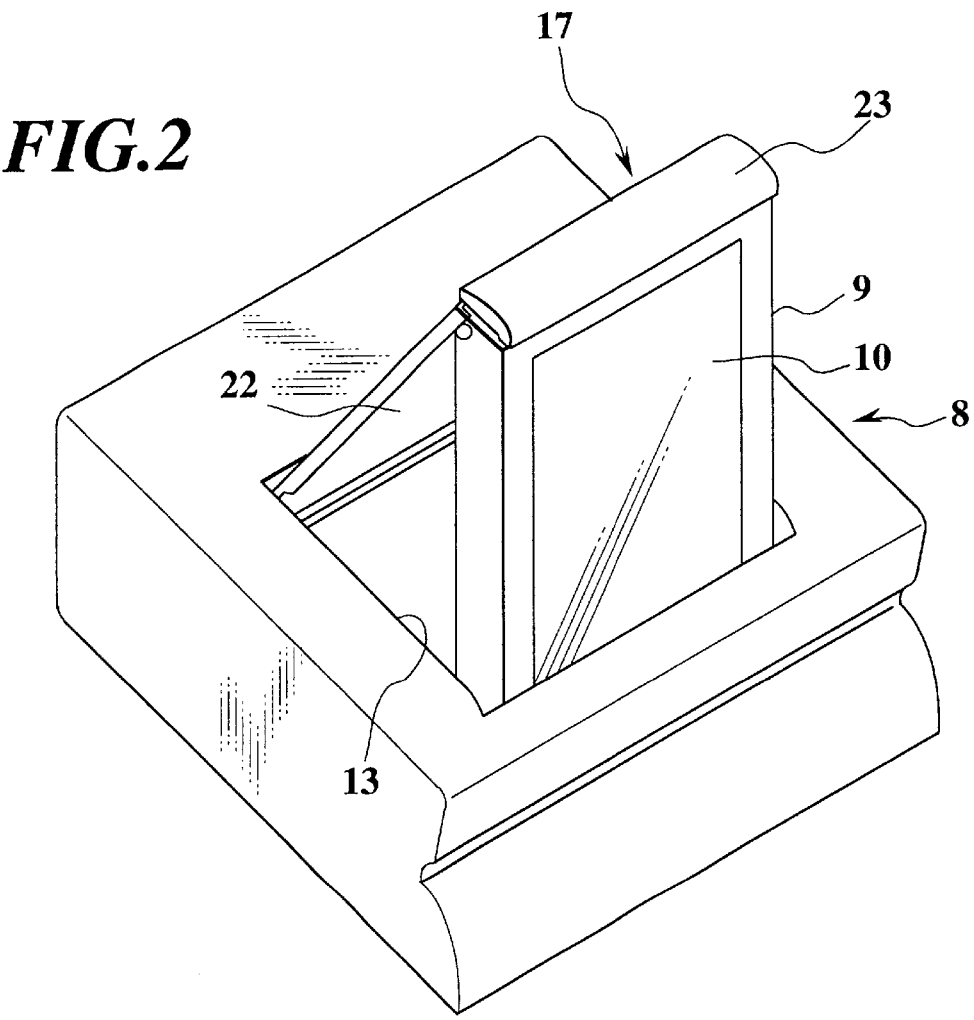
FIG. 2 is a perspective view showing a case in FIG. 1 into which the display is fitted.

FIG. 2 shows a case 8 into which the display 9 is fitted. An opening portion 13 from which the display is protruded is formed on an upper surface of the case 8. This opening portion 13 is normally closed by a hood 17, but it can be opened by rotating the hood 17 upwardly at the same time when the display 9 should be protruded from the case 8. Where a reference 22 is a first hood, and a reference 23 is a second hood.

Figure 4:
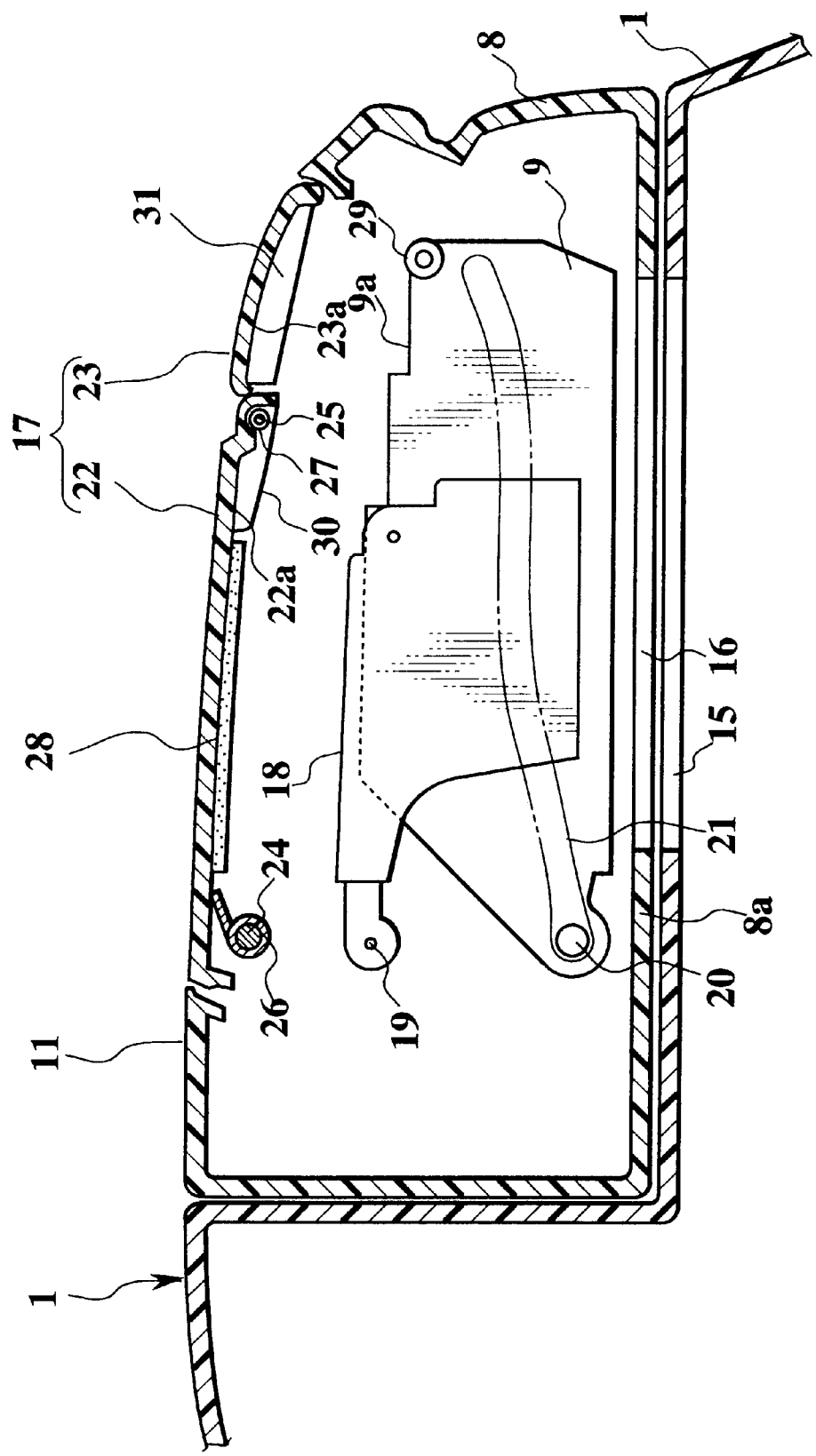
FIG. 4 is a sectional view showing the retractable setting-up structure for the display in FIG. 1 which is retracted into its accommodated state in the case.
Figure 5:
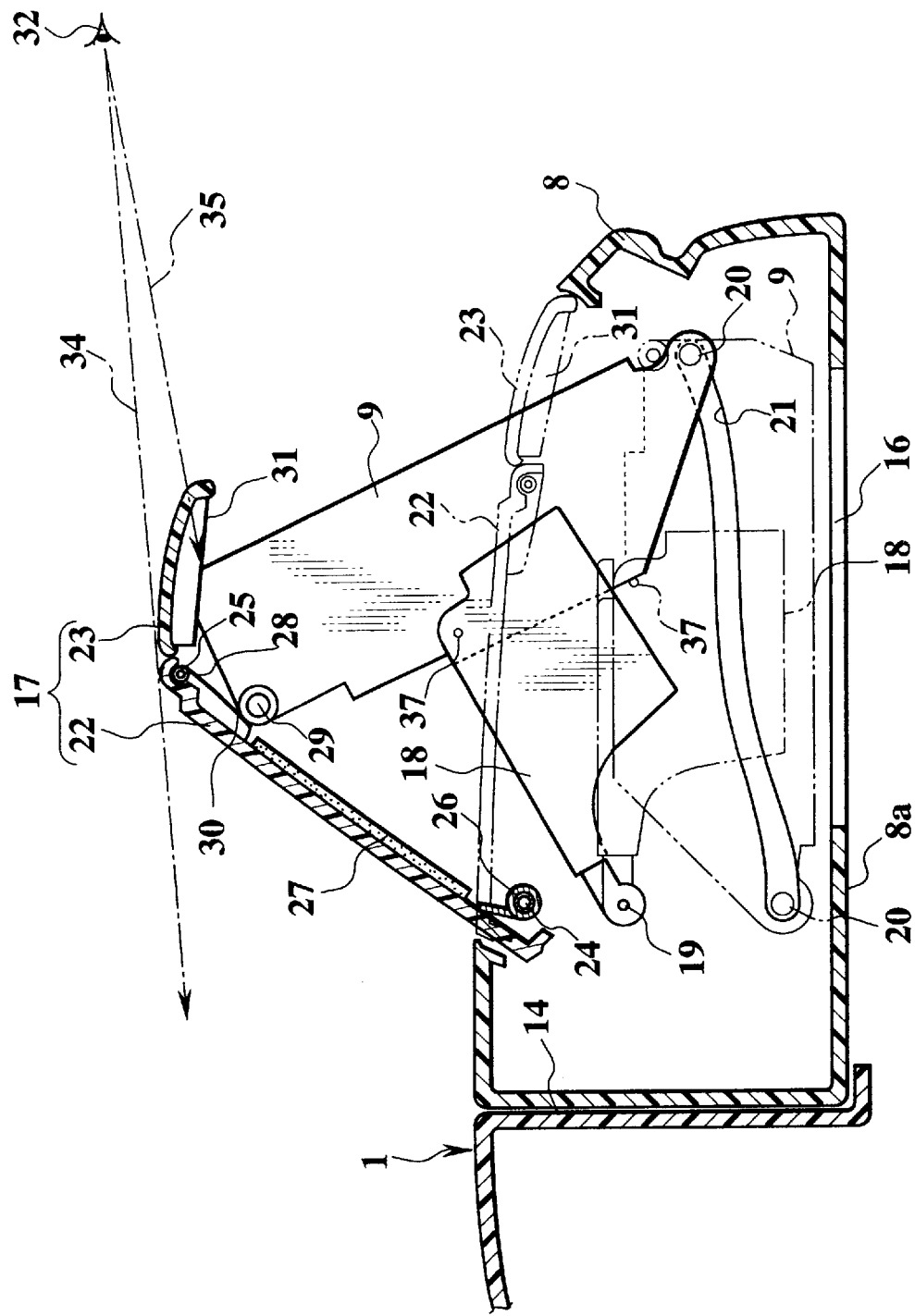
FIG. 5 is a sectional view showing the retractable setting-up structure for the display in FIG. 1 which is set up into its standing state out of the case.

As shown in FIGS. 4 and 5, a rotating plate 18 is placed in the case 8. The rotating plate 18 can be supported rotatably in the case 8 by a supporting axis 19 which is provided over both side surfaces of the case 8. The display 9 and the rotating plate 18 are coupled to each other via connector pins 37.

Pins 20 are fitted to base end portions (end portions on the supporting axis 19 side) of the display 9. The pins 20 are engaged slidably with cam grooves 21 which are formed on the case 8.

The cam grooves 21 are formed to become gradually higher towards the rear side (right side in FIG. 4) of the vehicle. When the pins 20 are positioned on the front side of the cam grooves 21, the display 9 can be put away into its lying state (accommodated state) indicated by a chain double-dashed line in FIG. 5 in the case 8. On the contrary, when the pins 20 are positioned on the rear side of the cam grooves 21, the display 9 can be set up into its standing state indicated by a solid line in FIG. 5 to be projected from the case 8. In other words, when the pins 20 are moved reciprocally along the cam grooves 21, the display 9 can be displaced between its lying state and its standing state.

The pins 20 are coupled to a motor (not shown) via a rack and pinion mechanism (not shown). A rotating motion of the motor is converted into a linear reciprocating motion by the rack and pinion mechanism to thus slide the pins 20.

When the display 9 is put away into its lying state in the case 8, the liquid crystal panel 10 of the display 9 is placed to oppose to a bottom surface 8a of the case 8.

A ventilating hole 16 is formed in the bottom surface 8a of the case 8 so as to oppose to the liquid crystal panel 10 of the display 9 which is folded into its lying state.

Figure 3:
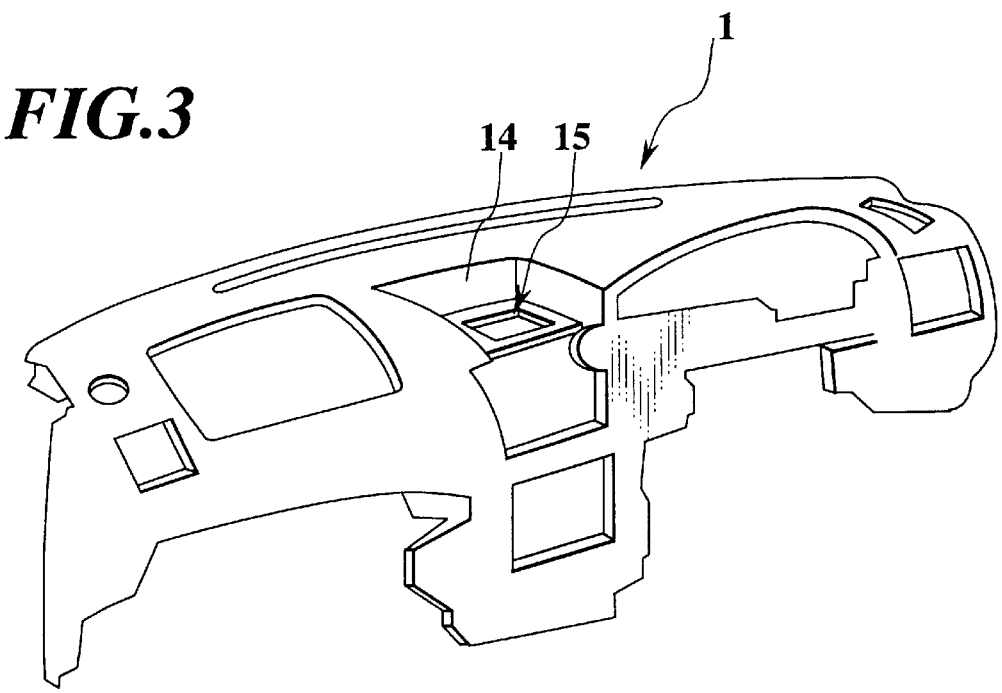
FIG. 3 is a perspective view showing an instrument panel in FIG. 1 before it is fitted into the compartment.

As shown in FIG. 3, a fitting recess portion 14 is formed on the upper surface of the instrument panel 1 to have a concave shape. When the case 8 is put into the fitting recess portion 14, the case 8 can be combined integrally with the instrument panel 1. A through hole 15 is formed in the fitting recess portion 14. As shown in FIG. 4, the through hole 15 are formed in registration with the ventilating hole 16.

Like the above, since the through hole 15 and the ventilating hole 16 are formed to coincide with each other in position, the air in the compartment can be introduced into the case 8 via the through hole 15 and the ventilating hole 16. The air in the compartment, when introduced into the case 8, can be brought into contact with the liquid crystal panel 10 of the display 9 to thus cool the liquid crystal panel 10. As a result, even when the instrument panel 1 is increased up to the high temperature by radiation heat of the solar light, the temperature rise of the liquid crystal panel 10 can be suppressed, so that the liquid crystal panel 10 can be in no way thermally destroyed or damaged.

Hence, a disadvantage caused because of the high temperature can be overcome when the display 9 is positioned on the upper surface of the instrument panel 1.

In turn, the hood 17 shown in FIGS. 4 and 5 will be explained hereunder. The hood 17 is composed of two members, i.e., the first hood 22 and the second hood 23. The opening portion 13 of the case 8 can be closed by these hoods 22, 23.

As shown in FIGS. 4 and 5, the first hood 22 has a fitting pin 24 on the base end side (supporting axis 19 side). The first hood 22 can be supported rotatably to the case 8 by inserting the fitting pin 24 into the case 8.

Closing springs 26 are fitted to the fitting pin 24 to be wound around it. The first hood 22 is pushed towards a closing direction by the closing springs 26 to close the opening portion 13.

The second hood 23 is supported rotatable to the top end of the first hood 22 by a connector pin 25. Closing springs 27 are fitted to the connector pin 25 to be wound around it. The second hood 23 is pushed towards the closing direction by the closing spring 27.

The closing springs 26, 27 wound around the fitting pin 24 and the connector pin 25 of the first hood 22 and the second hood 23 are designed such that the closing spring 26 has a larger spring force than that of the closing spring 27.

Since the spring forces of both the closing springs 26, 27 are selected to satisfy the above requirement, the first hood 22 and the second hood 23 are always held in their closed states when the display 9 is set into its lying state. Under this closing state, folding of the first hood 22 and the second hood 23 at a connecting portion between the second hood 23 and the first hood 22, i.e., the connector pin 25 can be eliminated. For this reason, the first hood 22 can be set to be substantially coplanar with the second hood 23 to thus improve an outer appearance of the hood 17.

A back surface of the first hood 22 is backed with a sheet-like thermal insulating material 28. In FIGS. 4 and 5, the thermal insulating material 28 is stuck on the back surface of the first hood 22, but such thermal insulating material 28 may be provided on a plurality of portions of the first hood 22. Similarly, the thermal insulating material 28 may be provided at appropriate portions on the back surface of the second hood 23.

A thermal insulating material having air layers therein is preferable as the thermal insulating material 28. For instance, urethane foam, nonwave fabric made of polypropylene and polyethylene, etc. may be employed as the thermal insulating material. In this fashion, even if the temperature of the hood 17 is raised by the solar light, thermal energy transmitted to the inside of the case 8 can be made small by providing the thermal insulating material 28 on the back surface of the hood 17. Therefore, the display 9 which is put away in the case 8 can be protected from heating by the solar light.

The display 9 can be set upright to rise out of the hood 17 by sliding the pins 20 along the cam grooves 21. During this rising-out operation, a back surface of the display 9 is brought into contact with a back surface of the hood 17 to thus push up the hood 17, so that the hood 17 can open the opening portion 13. In order to make this sliding smoothly, rotators 29 are fitted to a top end portion of the back surface of the display 9 and also ribs 30, 31 are provided on the back surfaces of the first hood 22 and the second hood 23 so as to face to the rotators 29.

More particularly, when the display 9 is set upright, first the rotators 29 contact to the ribs 31 of the second hood 23 and then roll along the ribs 31 upward to thus tilt up the display 9 gradually. Subsequently, when the display 9 is further tilted upwardly, the rotators 29 then contact to the ribs 30 of the first hood 22 and then roll along the ribs 30 to thus push up the first hood 22. Consequently, the first hood 22 can be pushed up against the spring force of the closing spring 26 to be rotated upwardly, so that the whole hood 17 can be separated from the opening portion 13 to thus open the opening portion 13.

Since the rotators 29 and the ribs 30, 31 are provided, friction between the display 9 and the hood 17 can be reduced smaller and therefore a smooth operation of the retractable setting-up structure can be assured. In addition, since the rotators 29 and the ribs 30, 31 have their small contact areas, strange sound can be prevented from being generated between them upon setting up the display 9.

With the above operation, as shown in FIG. 5, the display 9 can project from the opening portion 13 to be set into its usable state (its standing state). In this standing state of the display 9, the second hood 23 can be folded by the spring force of the closing spring 27 from the first hood 22 toward the display 9 so as to horizontally project from the top end portion of the display 9 like a visor. Hence, the solar light incident upon the compartment from the front window panel 2 cannot enter into the screen of the display 9, so that the screen of the display 9 does not reflect such solar light at all to thus provide clear images.

Figure 6:
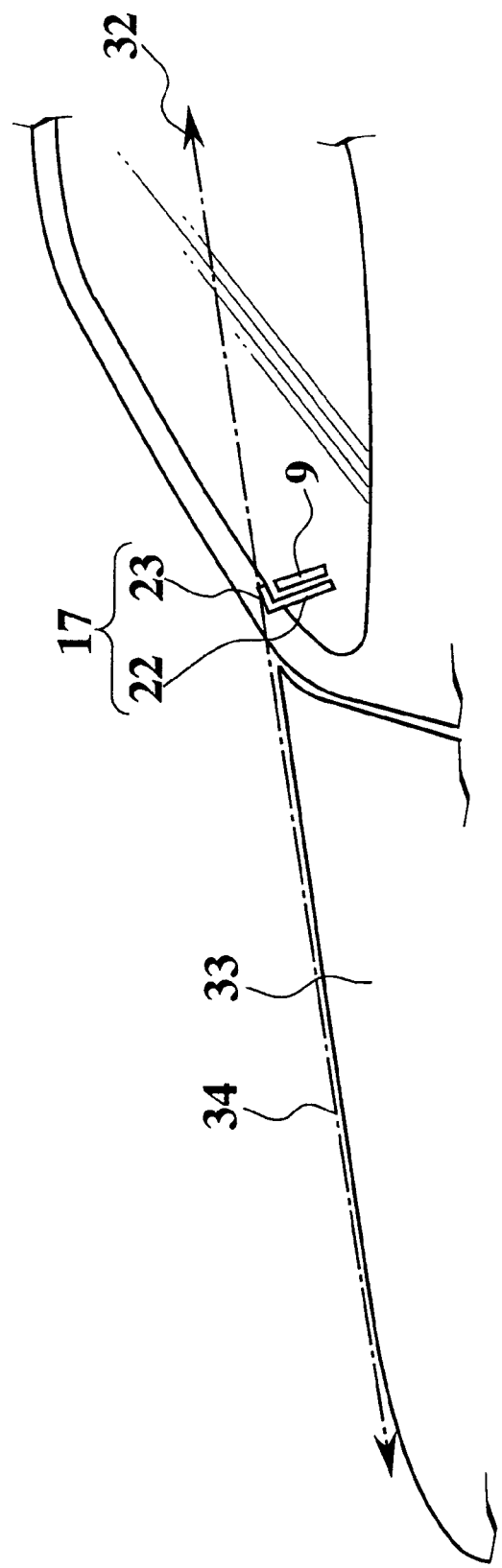
FIG. 6 is a side view showing an arrangement of the display in FIG. 1 with regard to a tangent line of driver's eyeshot to a front hood.

As shown in FIGS. 5 and 6, a set-up height of the hood 17 is set such that the top end of the hood 17 is located below a tangent line to the front hood 33 of the car body extended from the eyepoint 32 of the driver in the driver's seat.

The eyepoint 32 is a height of the eye of the driver in the driver's seat in its rearmost seat position. As shown in FIG. 6, the set-up hood 17 is designed to be positioned lower than such tangent line 34 to the front hood 33 extended from the driver's eyepoint 32. Hence, since the hood 17, i.e., the display 9 is positioned below a lower limit of the driver's front eyeshot when the driver is driving the car, the display 9 never obstructs the driver's front eyeshot so that the wide front eyeshot of the driver can be accomplished. As a result, even though the display 9 is arranged on the upper surface of the instrument panel 1, the display 9 never interferes with the driving of the car.

Figure 7:
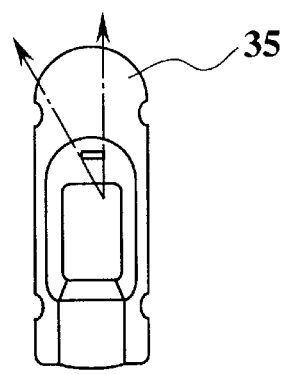
FIG. 7 is a plan view showing the arrangement of the display in FIG. 1 relative to a car body.
Figure 8:
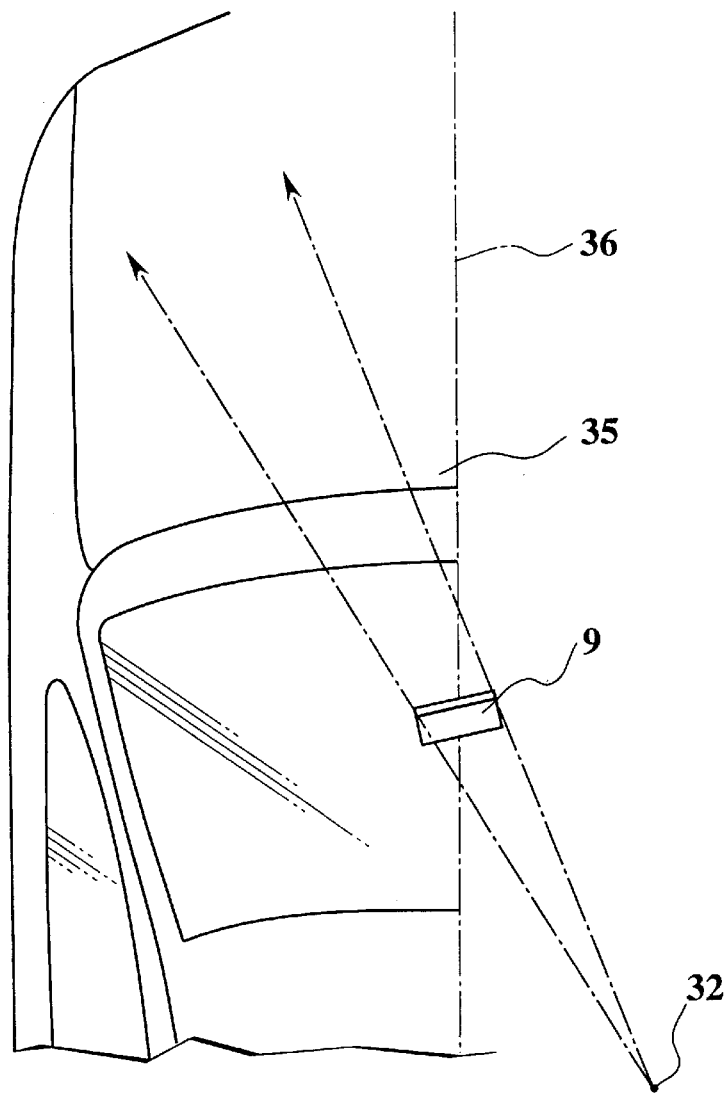
FIG. 8 is an enlarged fragmental plan view showing the arrangement of the display shown in FIG. 7.

FIGS. 7 and 8 show a retractable setting-up structure for a display according to a modification of the first embodiment of the present invention. FIGS. 7 and 8 show an arrangement of the display 9 with respect to a car body 35. In this modification, the display 9 provided on the upper surface of the instrument panel 1 is positioned obliquely relative to a longitudinal center line 36 of the car body 35. In other words, the display 9 is positioned obliquely relative to the driver's eyeshot, so that the driver can drive the car without obstruction of the driver's front eyeshot. Like the above, there is no situation where the display 9 interferes with the driving of the car.

Second Embodiment

Next, a second embodiment of the present invention will be explained with reference to FIGS. 9 to 12 hereunder.

In the second embodiment, only details of a display fitting structure and a retractable setting-up structure for a display are different from the above first embodiment of the present invention. Therefore, in FIGS. 9 to 12, the same reference numerals are applied to the same constituent portions as those in the first embodiment and their redundant explanation will be omitted in this disclosure.

Figure 9:
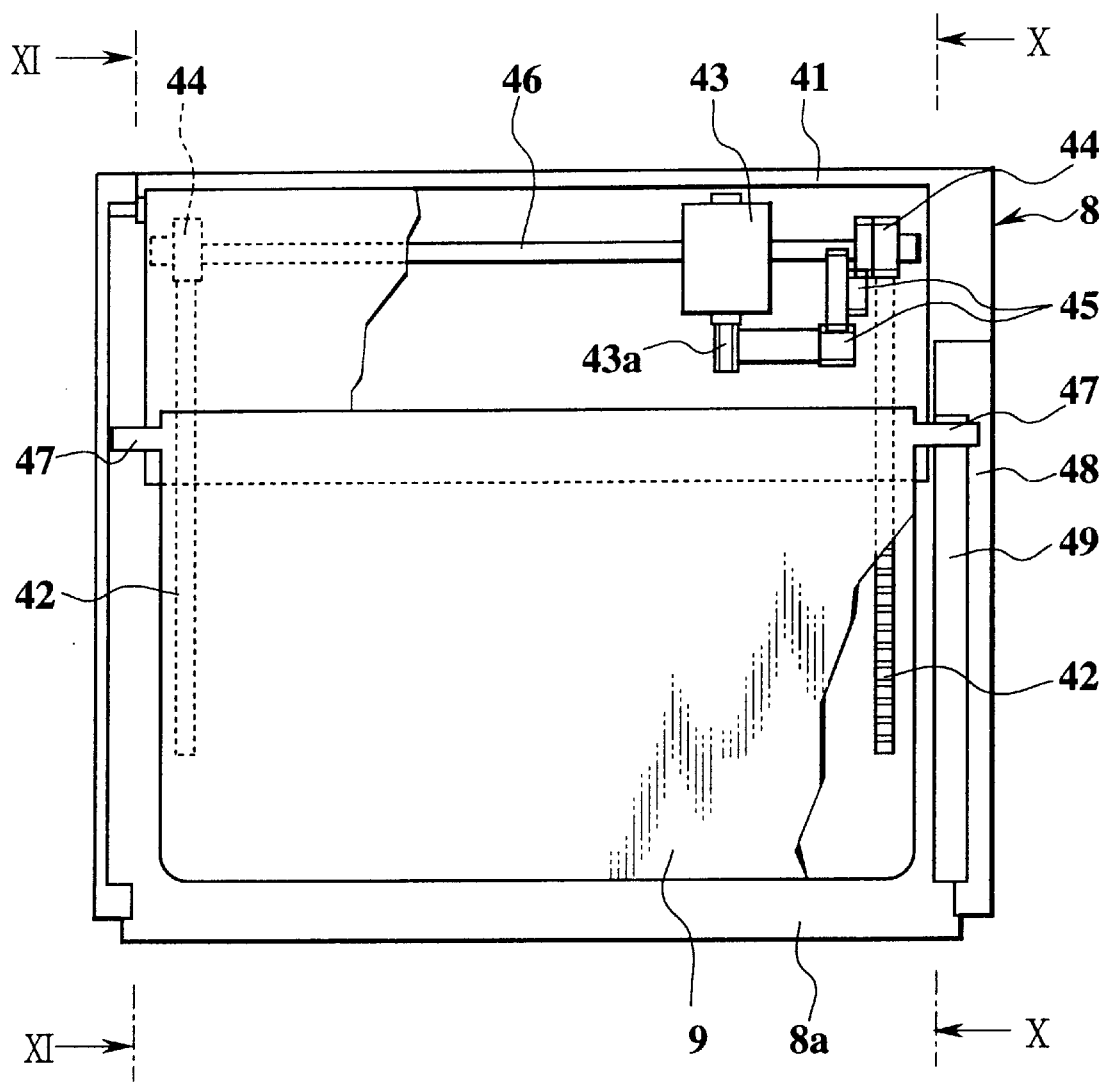
FIG. 9 is a plan view showing a retractable setting-up structure for a display according to a second embodiment of the present invention.
Figure 10:
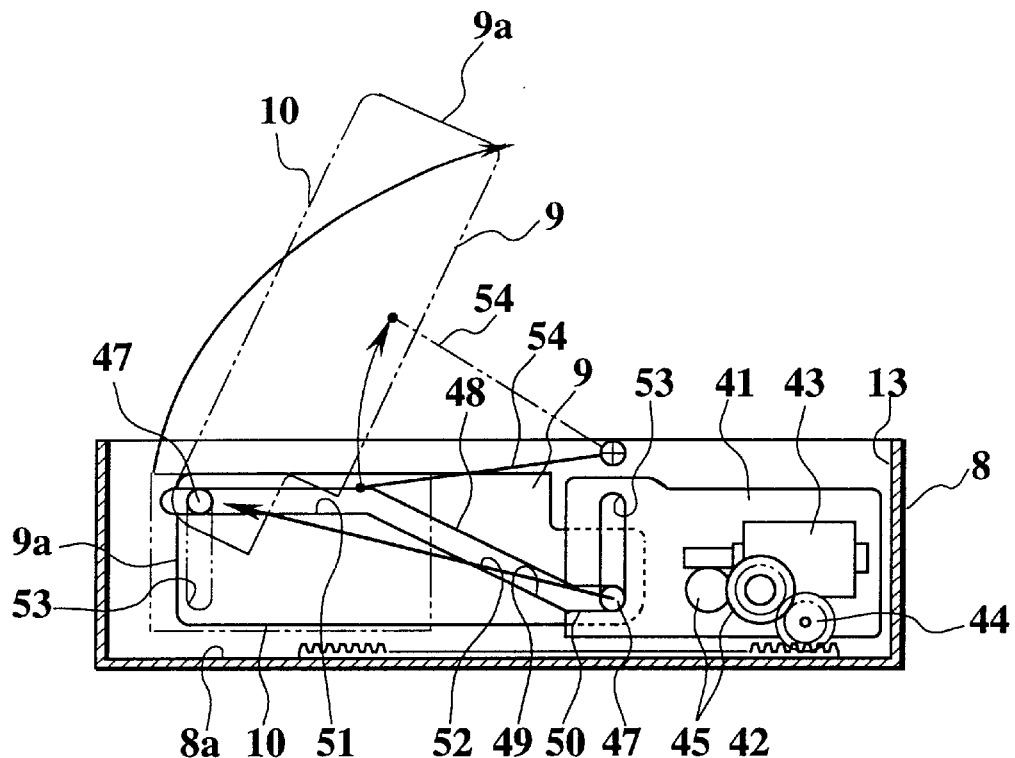
FIG. 10 is a sectional view, taken along an X—X line in FIG. 9, showing a sectional shape of the retractable setting-up structure for the display shown in FIG. 9.
Figure 11:
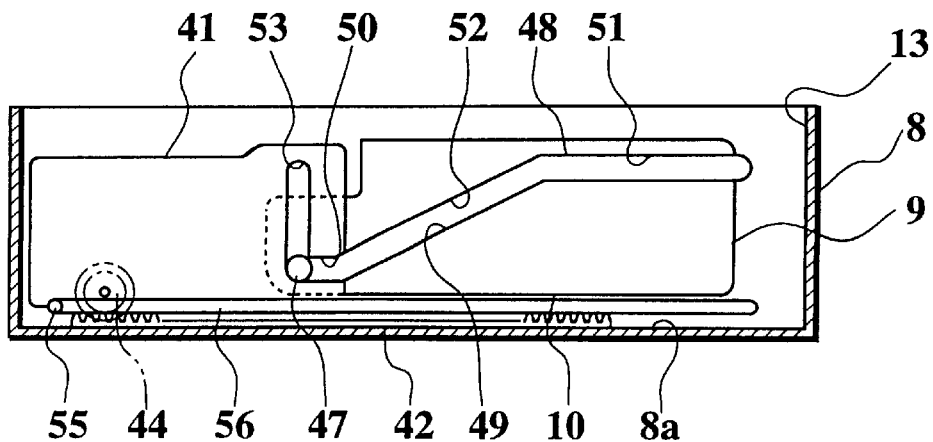
FIG. 11 is a sectional view, taken along an XI—XI line in FIG. 9, showing another sectional shape of the retractable setting-up structure for the display shown in FIG. 9.
Figure 12:
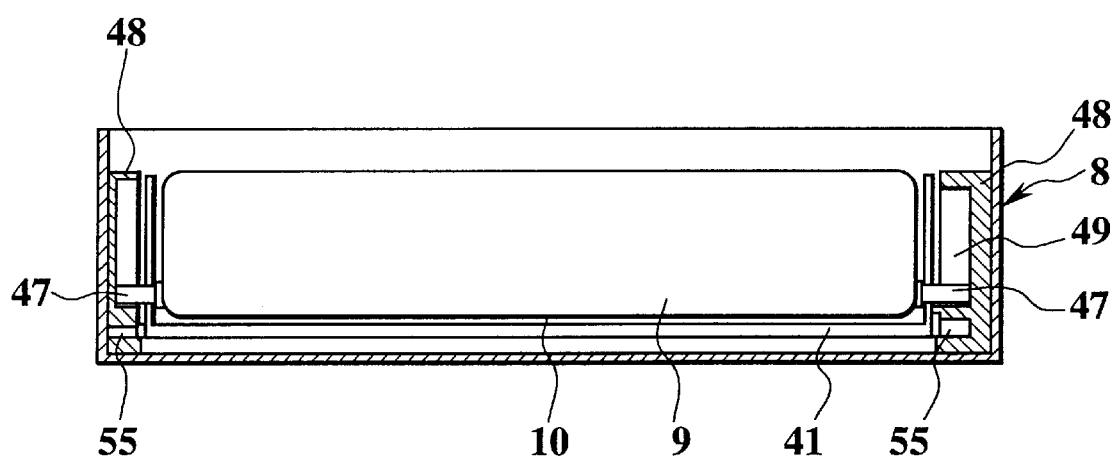
FIG. 12 is a sectional view, viewed from a front side of the vehicle, showing the retractable setting-up structure for the display shown in FIG. 9.

FIG. 9 is a plan view showing a structure for setting-up/retracting the display 9 out of/into the case 8 according to the second embodiment of the present invention. FIG. 10 is a sectional view showing the structure taken along an X—X line in FIG. 9. FIG. 11 is a sectional view showing the structure taken along an XI—XI line in FIG. 9. FIG. 12 is a sectional view showing the structure shown in FIG. 9 if viewed from the front side of the vehicle. A block 41 and the display 9 are placed in the case 8. The display 9 is put away in the case 8 such that the liquid crystal panel 10 faces to the bottom surface 8a of the case 8.

A pair of right and left racks 42, 42 which are separated into right and left sides are provided on the bottom surface 8a of the case 8. A pair of racks 42, 42 are placed to extend in the back/forth direction, i.e., vertical direction of the case 8. The block 41 is installed to be moved along the racks 42 in the vertical direction.

A motor 43 serving as a rotational driving source and a pair of right and left gears 44, 44 connected to the motor 43 are installed in the inside of the block 41. A pair of gears 44, 44 are fitted rotatably to the gear shaft 46 which is provided across the block 41 in the right/left direction, i.e., lateral direction, and are also engaged with the racks 42, 42 respectively.

One of the gears 44 is connected to the motor 43 via a rotation axis 43a of the motor 43 and a plurality of reduction gears 45 arranged between the gear 44 and the rotation axis 43a. When the motor 43 is rotated, the gears 44 are also rotated via the reduction gears 45. The gears 44, when rotated, move along the racks 42, so that the block 41 can be moved reciprocally along the vertical direction of the case 8.

While being coupled to the block 41, the display 9 is arranged in front of the block 41. The display 9 and the block 41 are connected by pins 47, 47 which are projected from both rear end side surfaces of the display 9. In other words, such pins 47, 47 are provided to penetrate front end portions of both side walls of the block 41 respectively and as a result the display 9 can be supported rotatably by the block 41.

Slide rails 48 which have cam grooves 49 respectively are formed on right/left inner side surfaces of the case 8. The pins 47 are inserted into the cam grooves 49 of the slide rails respectively. More particularly, the pins 47 are inserted tightly into the cam grooves 49 such that they can be slid along the cam grooves 49 with respective friction forces.

As shown in FIGS. 10 and 11, the cam grooves 49 of the slide rails 48 include lying holding portions 50 formed on the rear side of the case 8 horizontally to hold the display 9 in its lying state via the pins 47, standing holding portions 51 formed on the front side of the case 8 horizontally to hold the display 9 in its standing state via the pins 47, and guiding portions 52 formed to connect the lying holding portions 50 and the standing holding portions 51 and along which the pins 47 are shifted upward and downward according to their lateral movement.

The standing holding portions 51 is formed to be positioned higher than the lying holding portions 50. The guiding portions 52 is formed to incline upward-obliquely from the rear side to the front side of the case 8 to connect the lying holding portions 50 and the standing holding portions 51. Therefore, the pins 47 inserted into the cam grooves 49 are shifted upward along the guiding portions 52 when the block 41 is moved toward the front side of the case 8, and similarly the pins 47 are shifted downward along the guiding portions 52 when the block 41 is moved toward the rear side of the case 8.

At that time, the pins 47 are also shifted upward and downward with respect to the block 41. In order to make sure such up/down movement of the pins 47 relative to the block 41, vertical guide grooves 53 are formed on both side surfaces of the block 41. The pins 47 are passed through the vertical guide grooves 53.

The display 9 is connected to the case 8 via links 54. The links 54 can displace the display 9 with respect to the case 8 such that the display 9 is brought into its lying state when the block 41 is positioned at the rear side of the case 8 whereas the display 9 is brought into its standing state when the block 41, i.e., the display 9, is moved towards the front side of the case 8.

Horizontal axes 55 are provided to project from right and left side surfaces of the block 41 respectively. The horizontal axes 55 are then inserted into horizontal grooves 56 which are formed at corresponding positions on inner surfaces of the case 8 respectively. The horizontal grooves 56 extend along the vertical direction of the case 8. With the movement of the block 41, the horizontal axes 55 can be moved back and forth in the horizontal grooves 56.

In this manner, since the horizontal axes 55 are inserted into the horizontal grooves 56, the block 41 cannot displace in the vertical direction but can move in the back and forth direction only. As a result, lift-up of the block 41 can be prevented. In other words, the horizontal axes 55 and the horizontal grooves 56 can operate as a lift-up preventing mechanism for preventing the lift-up of the block 41. Therefore, setting-up of the display 9 can be carried out smoothly because the block 41 is not lifted up at all when the display 9 is set upright.

Next, an operation of the above-mentioned structure will be explained hereunder.

A solid line in FIG. 10 shows a state where the display 9 is put away to be laid in the case 8. In this state, the block 41 is positioned in the rear side of the case. The pins 47 are positioned in the lying holding portions 50 of the cam grooves 49 of the slide rails 48. At this time, unexpected movement of the pins 47 can be prevented by friction forces which are generated between the lying holding portions 50 and the pins 47. Accordingly, play of the pins 47 in the lying holding portions 50 can be eliminated, so that the display 9 can be held stably in its lying state via the pins 47.

When the motor 43 is biased, the gears 44 can be rotated while engaging with the racks 42. The overall block 41 can thus be moved forward in the case 8 according to such rotation of the gears 44.

According to the movement of the block 41, the display 9 is pushed forward and also the pins 47 can be slid in the cam grooves 49 of the slide rails 48. In other words, the pins 47 can slide so as to move from the lying holding portions 50 to the guiding portions 52.

At this time, the pins 47 are pushed up gradually because the guiding portions 52 are inclined upwardly. At the same time, a top end portion 9a of the display 9 can be displaced so as to be rotated upward and backward simultaneously because position of the display 9 can be regulated by the links 54. As a result, the top end portion 9a of the display 9 can be pushed out from the case 8 and thus the display 9 can be set up gradually into its standing state. When the pins 47 reach top ends of the guiding portions 52, the display 9 can be pushed out from the case 8 completely and set upright on the case 8 as shown in a chain line. During such standing operation of the display 9, the block 41 can be held in its horizontal state by the horizontal axes 55 and the horizontal grooves 56 so as to assist the smooth setting-up operation of the display 9.

When the motor 43 is further biased, the pins 47 can be moved into the standing holding portions 51 of the cam grooves 49. Since the pins 47 cannot moved inadvertently in the standing holding portions 51 because of friction forces, the display 9 can be maintained stably in its standing state.

The motor 43 must be rotated reversely when the display 9 is to be put away in the case 8. At that time, respective mechanisms mentioned above are operated in reverse order so that the display 9 can be easily put away.

What is claimed is:

1. A car display layout structure comprising:

a display arranged in a substantially central area of an upper surface of an instrument panel in a width direction of a vehicle; and an operation lever arranged on a steering wheel side relative to the display, the operation lever extending toward a center in width direction of the vehicle and shifted in a substantially vertical direction between the display and the steering wheel; wherein the operation lever is shifted to at least a horizontal position and an upwardly inclined position, and the display is arranged such that the operation lever in the upwardly inclined position is positioned at a refuge position displaced from a line connecting a driver's eyepoint with the display.

2. A car display layout structure according to claim 1, wherein the upwardly inclined position other than a driving position.

3. A car display layout structure comprising:

a case fitted onto an upper surface of an instrument panel, the case including an opening portion on an upper surface thereof;

a display capable of being set to an accommodated state and a standing state, the display in the accommodated state being laid in the case, the display in the standing state being set upright out of the case through the opening portion; and a hood being laid and closing the opening portion of the case when the display is in the accommodated state, the hood being stood up and opening the opening portion according to a standing operation of the display, the hood being positioned below a tangent line passing though a driver's eyepoint to a car hood during the standing operation of the display, and the hood including a portion extending from a top end of the display during the standing operation of the display, and wherein the display includes a display panel faced to a bottom of the case when the display is in the accommodated state, a rotating member is attached to rear top end portion of the display in the accommodated state so as to project from a top surface of the display, and the rotating member comes into contact with a back surface of the hood and pushes up the hood to open the opening portion during the standing operation of the display.

4. A car display layout structure according to claim 3, wherein a rib in opposition to the rotating member is arranged on the back surface of the hood, and the rotating member of the display slides on the rib.

5. A car display layout structure comprising:

a case fitted onto an upper surface of an instrument panel, the case including an opening portion on an upper surface thereof;

a display capable of being set to an accommodated state and a standing state, the display in the accommodated state being laid in the case, the display in the standing state being set upright out of the case through the opening portion; and a hood being laid and closing the opening portion of the case when the display is in the accommodated state, the hood being stood up and opening the opening portion according to a standing operation of the display, the hood being positioned below a tangent line passing through a driver's eyepoint to a car hood during the standing operation of the display, and the hood including a portion extending from a top end of the display during the standing operation of the display; wherein the hood is made of two members consisting of a first hood and a second hood in order to reduce a height of the hood projected from the opening portion when the display is in the standing state, and the first hood and the second hood are connected foldably into two pieces such that back surfaces of the first hood and the second hood are opposed to each other when the display is in the standing state.

6. A car display layout structure according to claim 5, wherein the first hood is biased by a first biasing member so as to close the opening portion, the second hood is biased by a second biasing member so as to close the opening portion, and biasing force from the second biasing member is set smaller than biasing force from the first biasing member.

7. A car display layout structure according to claim 5, wherein
the first hood and the second hood are folded into two pieces along a back and forth direction when the display is in the standing state and,
the second hood positioned on a rear side of the hood is folded downward, extends from a top end of the display, and intercepts a light incident into the display panel when the display is in the standing state.

8. A car display layout structure according to claim 7, wherein
a front end of the display in the accommodated state is supported by a pin member rotatably and slidably in a back and forth direction along a guiding member provided in the case,
an upper surface portion of the display is supported by a rotating plate whose one end is supported rotatably to the case,
the second hood is biased by a biasing member with respect to the first hood so as to close the opening portion,
a front end portion of the display in the accommodated state is gradually shifted towards a rear end of the opening portion in a middle of the standing operation of the display,
a rear upper end portion of the display in the accommodated state is shifted forward and upward so as to first come into contact with a back surface of the second hood and then come into contact with a back surface of the first hood in the middle of the standing operation of the display,
the first and second are pushed up integrally when the rear upper end portion of the display is in contact with the second hood, and
the second hood is folded downward by the biasing member when the rear upper end portion of the display is in contact with the first hood.

9. A car display layout structure comprising:
a case fitted onto an upper surface of an instrument panel, the case including an opening portion on an upper surface thereof;
a display capable of being set to an accommodated state and a standing state, the display in the accommodated state being laid in the case, the display in the standing state being set upright out of the case through the opening portion; and
a hood being laid and closing the opening portion of the case when the display is in the accommodated state, the hood being stood up and opening the opening portion according to a standing operation of the display, the hood being positioned below a tangent line passing though a driver's eyepoint to a car hood during the standing operation of the display, and the hood including an end portion extending from a top end of the display during the standing operation of the display, wherein
the display arranged under a front window panel,
a tangent line passing through the driver's eyepoint to the end portion of the hood passes through a front window panel as the display is set to the standing state, and
the end portion of the hood extends in an opposite direction to the front window panel as the display is set to the standing state.

10. A car display layout structure according to claim 9, wherein
the hood is made of two members consisting of a first hood and a second hood in order to reduce a height of the hood projected from the opening portion when the display is in the standing state, and
the first hood and the second hood are connected foldably into two pieces such that back surfaces of the first hood and the second hood are opposed to each other when the display is in the standing state.

11. A car display layout structure according to claim 10, wherein
the first hood and the second hood are folded into two pieces along a back and forth direction when the display is in the standing state and,
the second hood positioned on a rear side of the hood is folded downward, extends from a top end of the display, and intercepts a light incident into the display panel when the display is in the standing state.

12. A car display layout structure according to claim 9, wherein
an rear end of the hood is positioned below a tangent line passing through driver's eyepoint to the car body hood when the display is in the standing state.

13. A car display layout structure according to claim 12, wherein
a steering wheel is arranged on a driver side relative to the display,
an operation lever shifted in a substantially vertical direction is arranged between the display and the steering wheel, and
a display panel of the display in the standing state is arranged such that the operation lever which is shifted to at least one of a driving position and a parking position is positioned at a refuge position displaced from a line connecting driver's eyepoint with the display.

14. A car display layout structure according to claim 9, wherein
the display includes a display panel faced to a bottom of the case when the display is in the accommodated state.

15. A car display layout structure according to claim 14, wherein
the case includes a ventilating hole penetrating through the bottom thereof,
the display panel of the display comes into contact with an air passing through the ventilating hole when the display is in the accommodated state.

16. A car display layout structure according to claim 15, wherein
the instrument panel includes a through hole capable of introducing a air in a compartment into the ventilating hole.

17. A car display layout structure according to claim 9, wherein
a front end of the display in the accommodated state is supported by a pin member rotatable and slidably in a back and forth direction, and
the display is supported by a rotating plate whose one end is supported rotatably to the case.

18. A car display layout structure according to claim 17, wherein
the pin member slides back and forth along a guiding member provided in the case,
the guiding member is formed to be inclined front-downward such that its front end is positioned lower and its rear end is positioned higher, and a lower end of the display is gradually shifted up toward the opening portion of the case during the standing operation.

19. A car display layout structure according to claim 18, wherein one end of the rotating plate is supported rotatably to an axis on a front side of the case and other end of the rotating plate is supported rotatably to an upper surface of the display in the accommodated state, and the lower end of the display is gradually shifted toward a rear end of the opening portion during the standing operation.

\* \* \* \* \*

UNITED STATES PATENT AND TRADEMARK OFFICE
CERTIFICATE OF CORRECTION

PATENT NO. : 6,049,288
DATED : April 11, 2000
INVENTOR(S) : Yoshiki Kawasaki

Page 1 of 1

It is certified that error appears in the above-identified patent and that said Letters Patent is hereby corrected as shown below:

Claim 2,
Line 2, after "position", insert -- corresponds to a position --.

Signed and Sealed this

Twentieth Day of November, 2001

*Attest:*

*Nicholas P. Godici*

*Attesting Officer*

NICHOLAS P. GODICI
*Acting Director of the United States Patent and Trademark Office*